United States Patent
Park et al.

(10) Patent No.: US 10,958,300 B2
(45) Date of Patent: Mar. 23, 2021

(54) SYMBOL PROCESSING USING PROCESSING SEQUENCES

(71) Applicant: QUALCOMM Incorporated, San Diego, CA (US)

(72) Inventors: Seyong Park, San Diego, CA (US); Jing Lei, San Diego, CA (US); Renqiu Wang, San Diego, CA (US); Joseph Binamira Soriaga, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 16/274,100

(22) Filed: Feb. 12, 2019

(65) Prior Publication Data

US 2019/0260419 A1    Aug. 22, 2019

Related U.S. Application Data

(60) Provisional application No. 62/710,300, filed on Feb. 16, 2018.

(51) Int. Cl.
*H04W 4/00* (2018.01)
*H04B 1/7073* (2011.01)
(Continued)

(52) U.S. Cl.
CPC .......... *H04B 1/70735* (2013.01); *H04J 13/16* (2013.01); *H04L 1/0003* (2013.01);
(Continued)

(58) Field of Classification Search
CPC ... H04B 1/70735; H04L 27/18; H04L 1/0003; H04L 5/026; H04L 5/0023; H04J 13/16
See application file for complete search history.

(56) References Cited

U.S. PATENT DOCUMENTS

| | | | |
|---|---|---|---|
| 6,628,667 B1 * | 9/2003 | Murai | H04J 13/12 370/335 |
| 2017/0006525 A1 * | 1/2017 | Ruiz Delgado | H04W 72/0446 |

(Continued)

FOREIGN PATENT DOCUMENTS

| | | |
|---|---|---|
| EP | 3413495 A1 | 12/2018 |
| WO | 2017135693 A1 | 8/2017 |

OTHER PUBLICATIONS

Yongkang et al. ("SCMA Codebook Design Based on Constellation Rotation", Jul. 31, 2017) (Year: 2017).*

(Continued)

*Primary Examiner* — Maharishi V Khirodhar
(74) *Attorney, Agent, or Firm* — Harrity & Harrity, LLP/Qualcomm

(57) ABSTRACT

Various aspects of the present disclosure generally relate to wireless communication. In some aspects, a user equipment may determine, when using resource spread multiple access with non-orthogonal multiple access, that a particular modulation scheme is enabled. The user equipment may process symbols using a set of processing sequences selected based at least in part on the particular modulation scheme such that the particular modulation scheme is preserved for the symbols. The user equipment may transmit the symbols based at least in part on processing the symbols using the set of processing sequences. Numerous other aspects are provided.

30 Claims, 13 Drawing Sheets

(51) Int. Cl.
  *H04J 13/16*   (2011.01)
  *H04L 1/00*    (2006.01)
  *H04L 5/02*    (2006.01)
  *H04L 27/18*   (2006.01)
  *H04L 5/00*    (2006.01)
(52) U.S. Cl.
  CPC .............. *H04L 5/026* (2013.01); *H04L 27/18* (2013.01); *H04L 5/0023* (2013.01)

(56) References Cited

U.S. PATENT DOCUMENTS

2018/0077685 A1\* 3/2018 Wu ..................... H04W 72/02
2019/0036746 A1\* 1/2019 Hwang ................ H04L 1/0061

OTHER PUBLICATIONS

Daniel (QAM codebooks for low complexity limited feedback MIMO beamforming, 2007) (Year: 2007).\*
Intel Corporation: "On Spreading-based NOMA Schemes," 3GPP Draft; R1-1609500 Intel Spreading-Based NOMA Schemes, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016, XP051149539, 8 pages, Retrieved from the Internet: URL: http://www.3gpp.org/ftp/Meetings_3GPP_SYNC/RAN1/Docs/ [retrieved on Oct. 9, 2016], Section 2, p. 1-p. 2.
International Search Report and Written Opinion—PCT/US2019/017825—ISA/EPO—dated Apr. 18, 2019.

\* cited by examiner

US 10,958,300 B2

SYMBOL PROCESSING USING PROCESSING SEQUENCES

CROSS-REFERENCE TO RELATED APPLICATIONS UNDER 35 U.S.C. § 119

This application claims priority to U.S. Provisional Patent Application No. 62/710,300, filed on Feb. 16, 2018, entitled "TECHNIQUES AND APPARATUSES FOR SYMBOL PROCESSING," which is hereby expressly incorporated by reference herein.

FIELD OF THE DISCLOSURE

Aspects of the present disclosure generally relate to wireless communication, and more particularly to techniques and apparatuses for symbol processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, when using resource spread multiple access with non-orthogonal multiple access, that a particular modulation scheme is enabled, wherein the particular modulation scheme is $\pi/2$ binary phase shift keying or $\pi/4$ quadrature phase shift keying. The method may include processing symbols using a set of processing sequences selected based at least in part on the particular modulation scheme such that the particular modulation scheme is preserved for the symbols. The method may include transmitting the symbols based at least in part on processing the symbols using the set of processing sequences.

In some aspects, a user equipment for wireless communication may include memory and one or more processors operatively coupled to the memory. The memory and the one or more processors may be configured to determine, when using resource spread multiple access with non-orthogonal multiple access, that a particular modulation scheme is enabled, wherein the particular modulation scheme is $\pi/2$ binary phase shift keying or $\pi/4$ quadrature phase shift keying. The memory and the one or more processors may be configured to process symbols using a set of processing sequences selected based at least in part on the particular modulation scheme such that the particular modulation scheme is preserved for the symbols. The memory and the one or more processors may be configured to transmit the symbols based at least in part on processing the symbols using the set of processing sequences.

In some aspects, a non-transitory computer-readable medium may store one or more instructions for wireless communication. The one or more instructions, when executed by one or more processors of a user equipment, may cause the one or more processors to determine, when using resource spread multiple access with non-orthogonal multiple access, that a particular modulation scheme is enabled, wherein the particular modulation scheme is $\pi/2$ binary phase shift keying or $\pi/4$ quadrature phase shift keying. The one or more instructions, when executed by the one or more processors of the user equipment, may cause the one or more processors to process symbols using a set of processing sequences selected based at least in part on the particular modulation scheme such that the particular modulation scheme is preserved for the symbols. The one or more instructions, when executed by the one or more processors of the user equipment, may cause the one or more processors to transmit the symbols based at least in part on processing the symbols using the set of processing sequences.

In some aspects, an apparatus for wireless communication may include means for determining, when using resource spread multiple access with non-orthogonal multiple access, that a particular modulation scheme is enabled, wherein the particular modulation scheme is $\pi/2$ binary phase shift keying or $\pi/4$ quadrature phase shift keying. The apparatus may include means for processing symbols using a set of processing sequences selected based at least in part on the particular modulation scheme such that the particular modulation scheme is preserved for the symbols. The apparatus may include means for transmitting the symbols based at least in part on processing the symbols using the set of processing sequences.

In some aspects, a method of wireless communication, performed by a base station (BS), may include receiving, when using resource spread multiple access with non-orthogonal multiple access, symbols processed using a set of processing sequences selected based at least in part on a particular modulation scheme such that the particular modulation scheme is preserved for the symbols, wherein the particular modulation scheme is π/2 binary phase shift keying or π/4 quadrature phase shift keying. The method may include processing the symbols using based on the particular modulation scheme being preserved for the symbols.

In some aspects, a user equipment for wireless communication may include memory and one or more processors operatively coupled to the memory. The memory and the one or more processors may be configured to receive, when using resource spread multiple access with non-orthogonal multiple access, symbols processed using a set of processing sequences selected based at least in part on a particular modulation scheme such that the particular modulation scheme is preserved for the symbols, wherein the particular modulation scheme is π/2 binary phase shift keying or π/4 quadrature phase shift keying. The memory and the one or more processors may be configured to process the symbols using based on the particular modulation scheme being preserved for the symbols.

In some aspects, a non-transitory computer-readable medium may store one or more instructions for wireless communication. The one or more instructions, when executed by one or more processors of a base station, may cause the one or more processors to receive, when using resource spread multiple access with non-orthogonal multiple access, symbols processed using a set of processing sequences selected based at least in part on a particular modulation scheme such that the particular modulation scheme is preserved for the symbols, wherein the particular modulation scheme is π/2 binary phase shift keying or π/4 quadrature phase shift keying. The one or more instructions, when executed by one or more processors of a base station, may cause the one or more processors to process the symbols using based on the particular modulation scheme being preserved for the symbols.

In some aspects, an apparatus may include means for receiving, when using resource spread multiple access with non-orthogonal multiple access, symbols processed using a set of processing sequences selected based at least in part on a particular modulation scheme such that the particular modulation scheme is preserved for the symbols, wherein the particular modulation scheme is π/2 binary phase shift keying or π/4 quadrature phase shift keying. The apparatus may include means for processing the symbols using based on the particular modulation scheme being preserved for the symbols.

Aspects generally include a method, apparatus, device, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
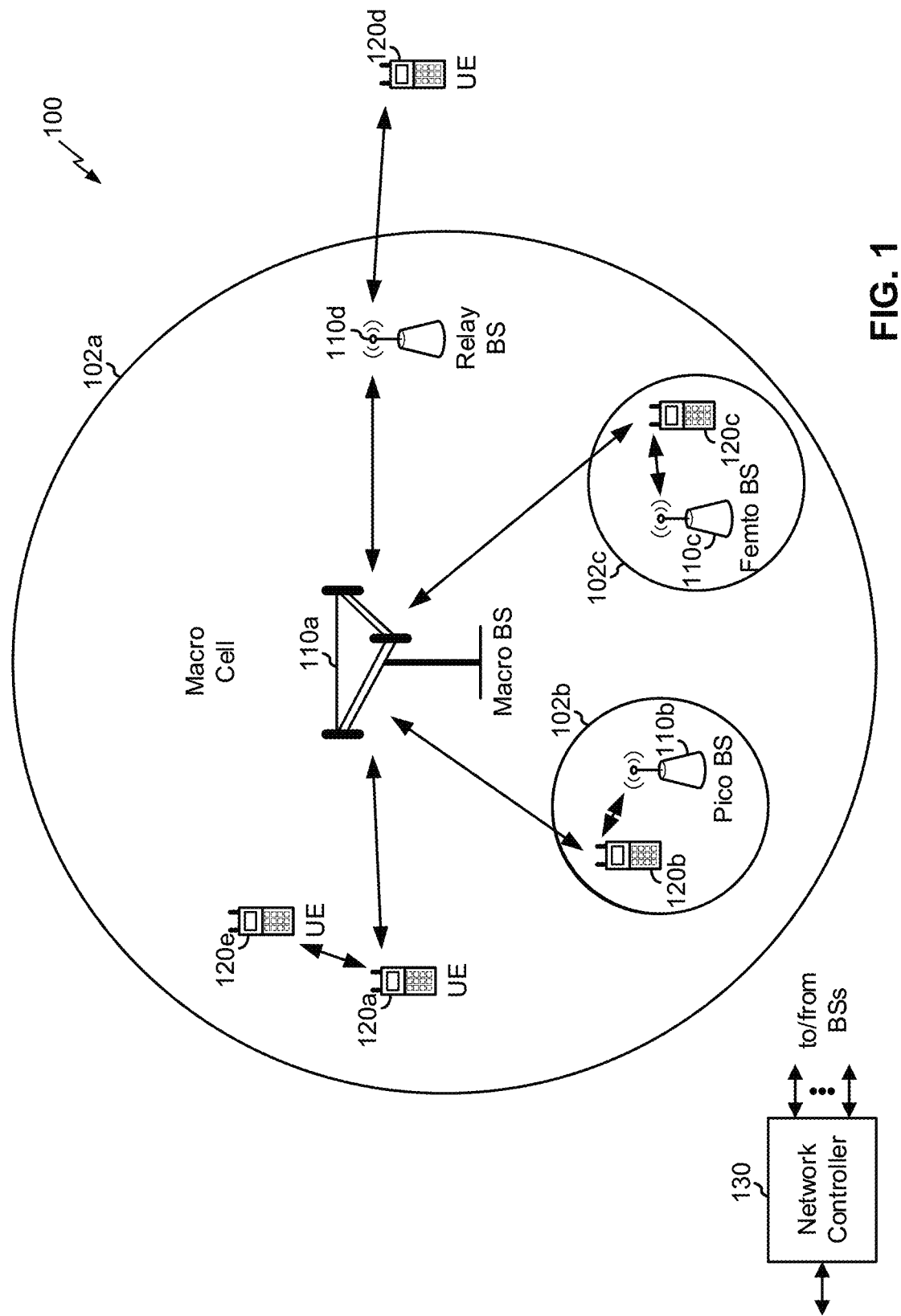
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network)

via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
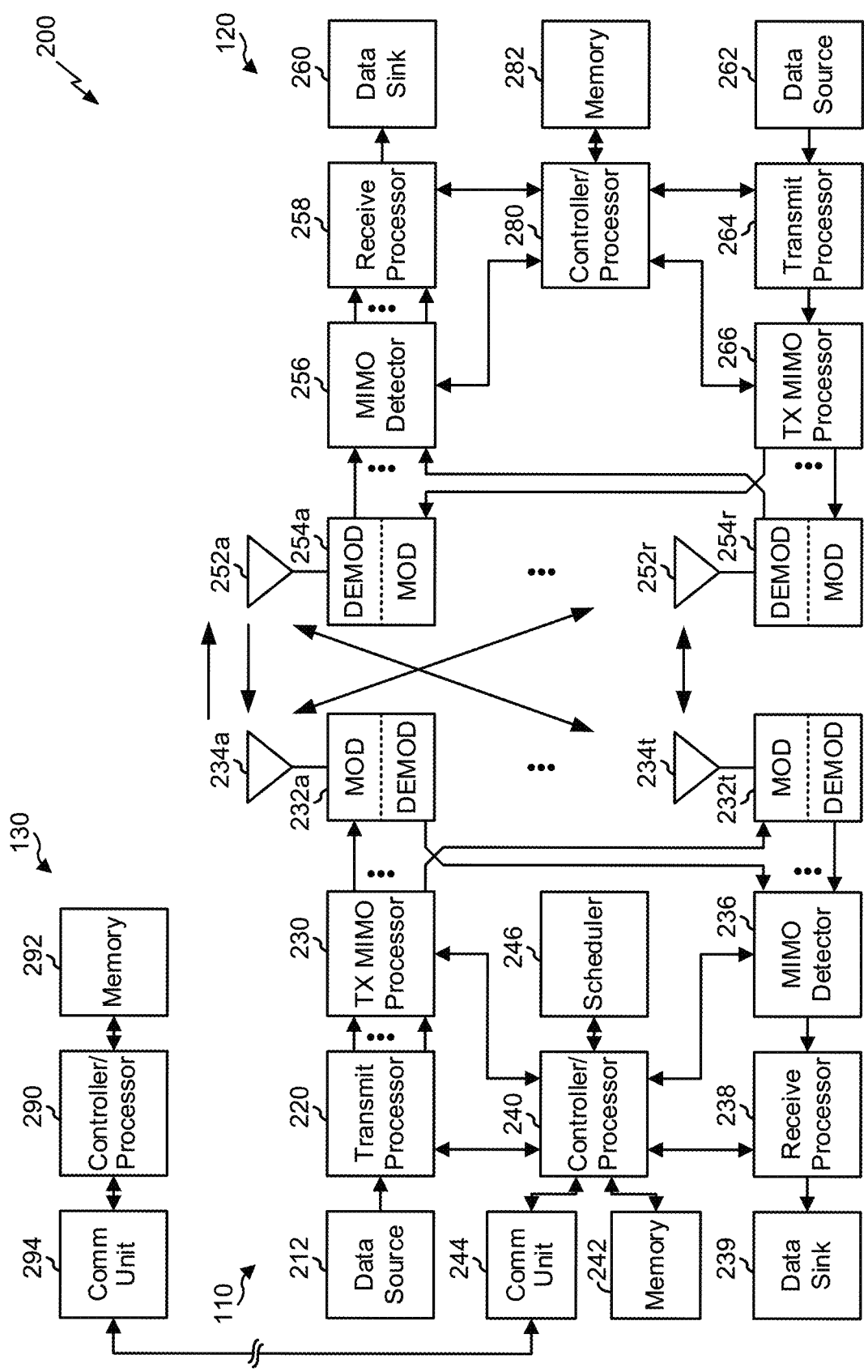
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with symbol processing, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, when using resource spread multiple access with non-orthogonal multiple access, that a particular modulation scheme is enabled, means for processing symbols using a set of processing sequences selected based at least in part on the particular modulation scheme such that the particular modulation scheme is preserved for the symbols, means for transmitting the symbols based at least in part on processing the symbols using the set of processing sequences, and/or the like. In some aspects, such means may include one or more components of UE 120 described in connection with FIG. 2.

In some aspects, BS 110 may include means for receiving, when using resource spread multiple access with non-orthogonal multiple access, symbols processed using a set of processing sequences selected based at least in part on a particular modulation scheme such that the particular modulation scheme is preserved for the symbols, wherein the particular modulation scheme is π/2 binary phase shift keying or π/4 quadrature phase shift keying; means for processing the symbols using based on the particular modulation scheme being preserved for the symbols; and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
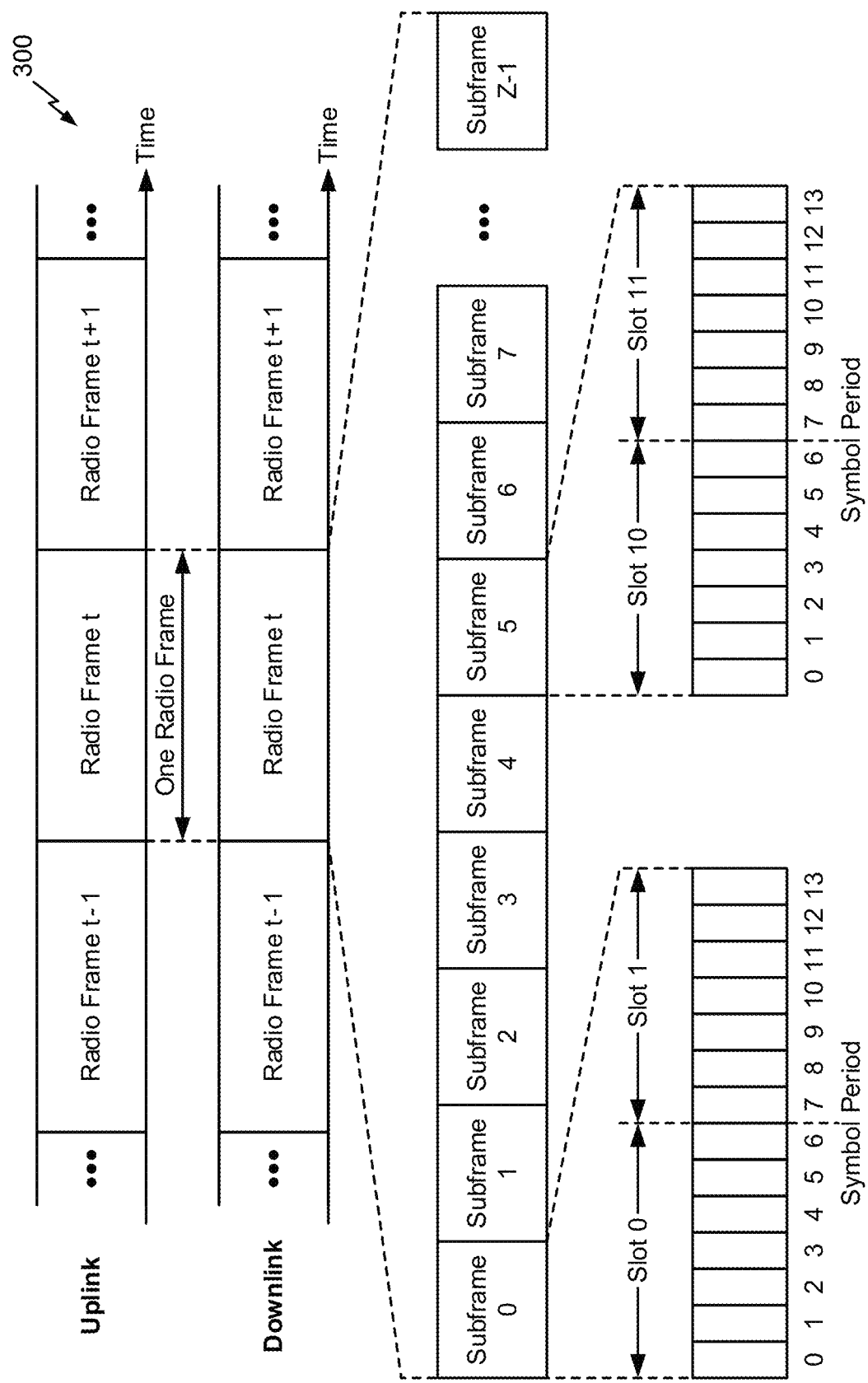
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2 L symbol periods, where the 2 L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
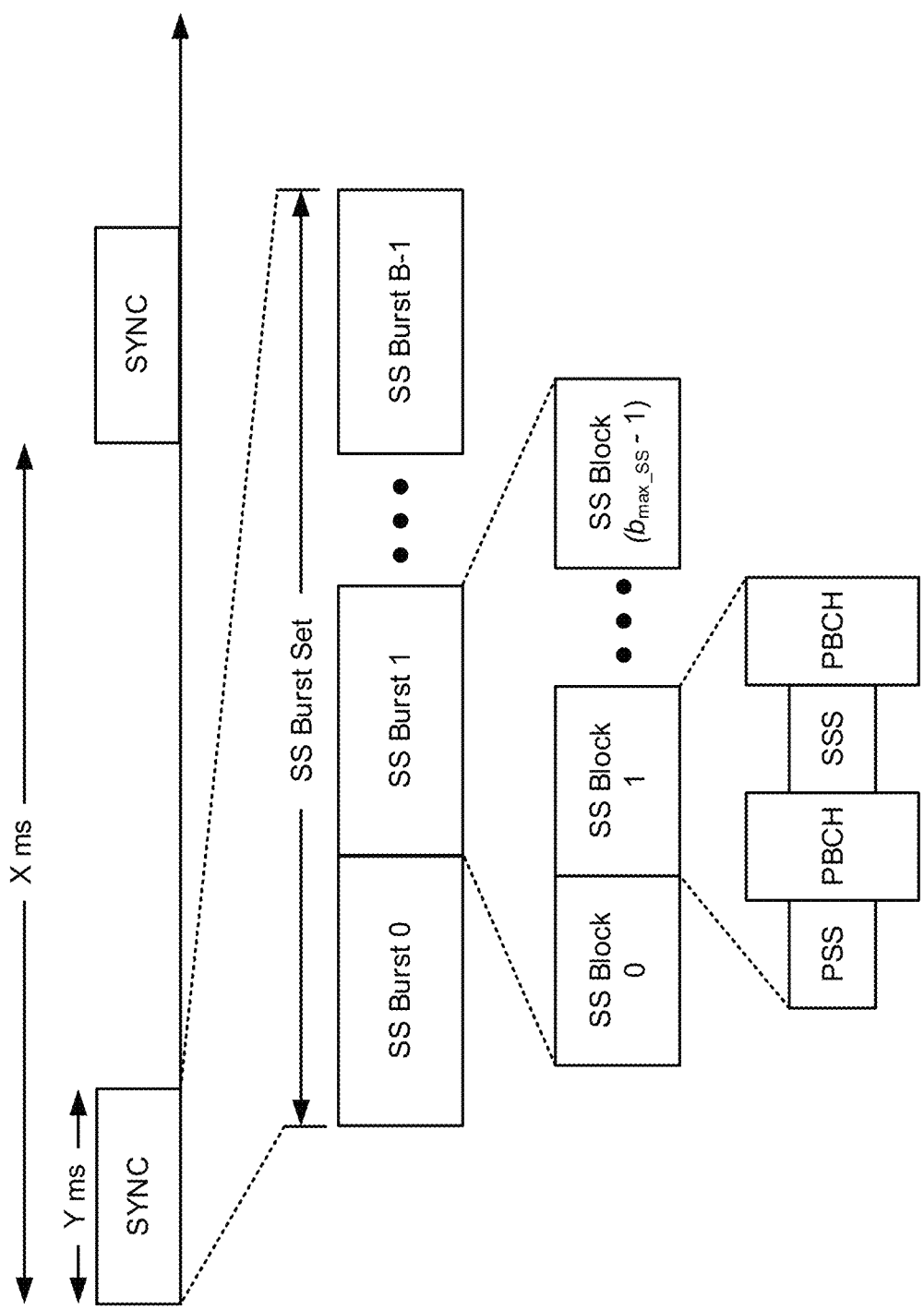
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
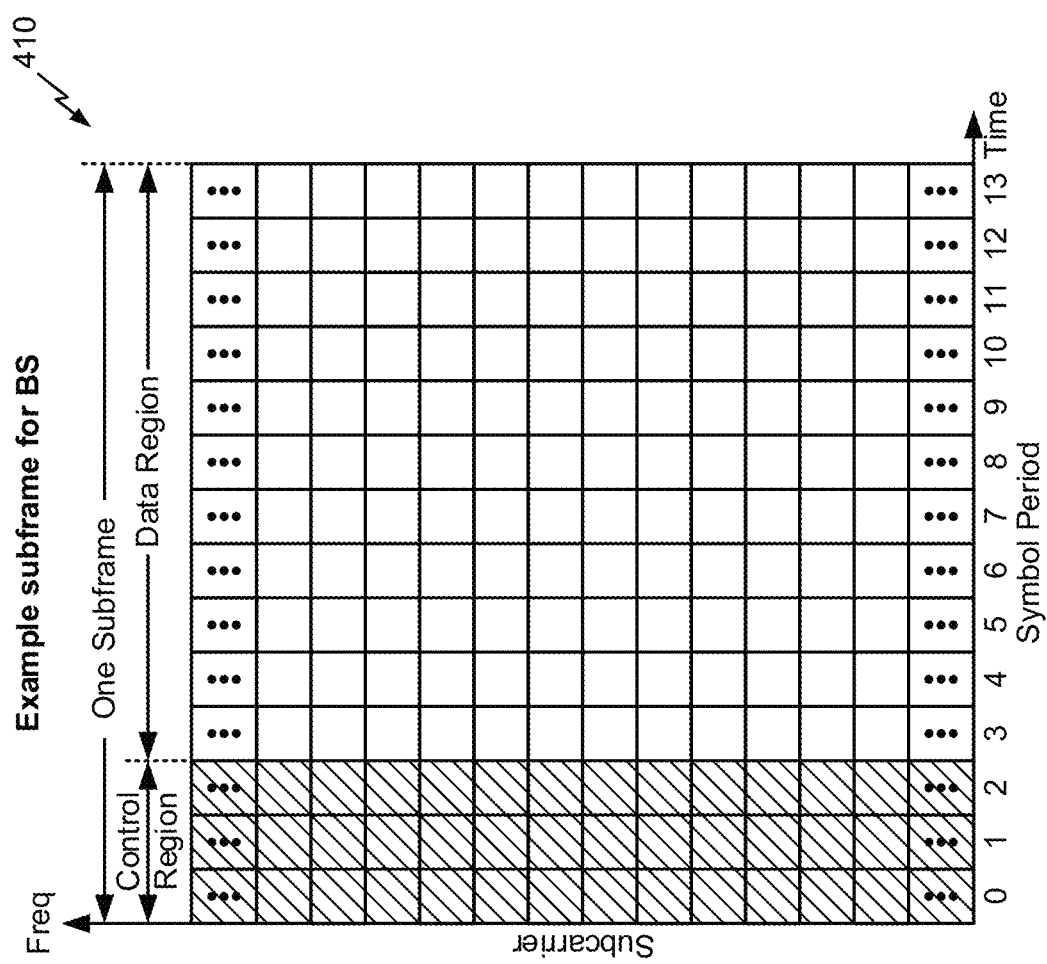
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q–1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q–1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
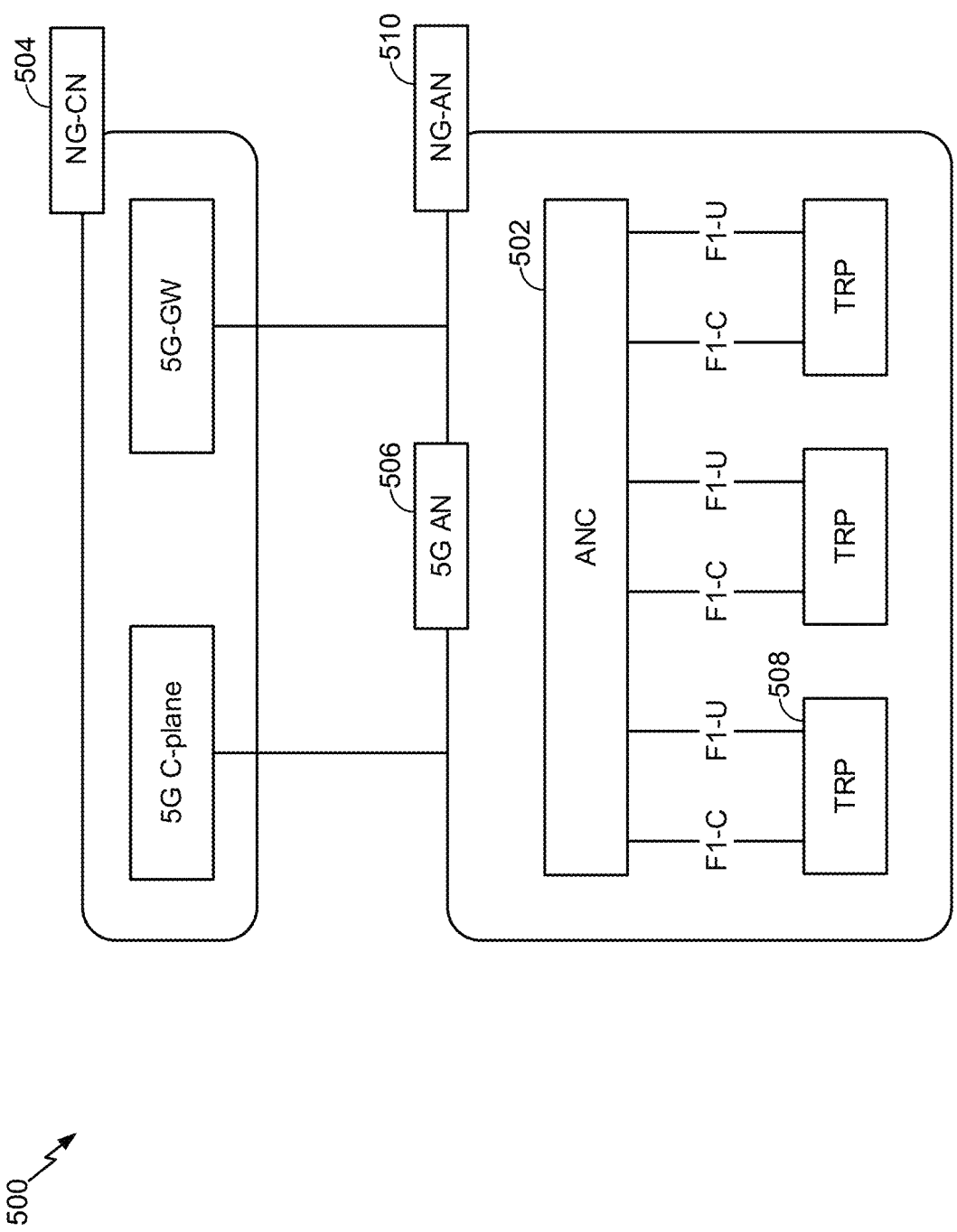
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
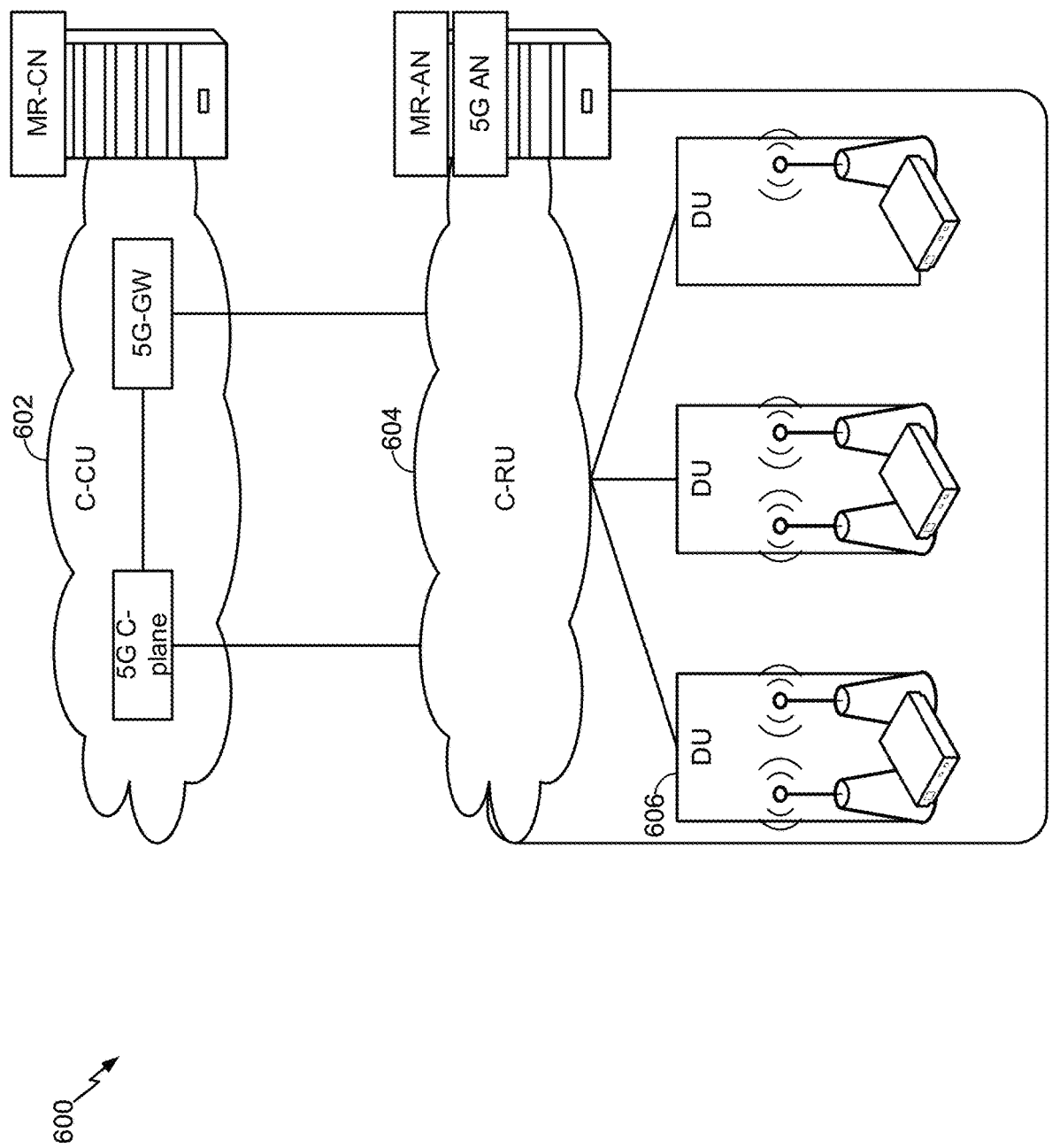
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

A UE may modulate and process data to enable transmission of the data. For example, the UE may segment data into transport blocks for transport, encode the data, scramble the data, modulate the data, and/or the like. In resource spread multiple access (RSMA) using non-orthogonal multiple access (NOMA) based communication, the UE may apply a relatively low-rate channel coding scheme (e.g., less than a threshold rate, such as BPSK, QPSK, and/or the like) and may apply UE specific scrambling to data. In this way, a network may enable grant-free transmission, asynchronous multiple access, and/or the like. Moreover, use of RSMA using NOMA may enable a plurality of UEs to share a common set of network resources.

In a NOMA-based processing scheme, the UE may apply, after modulating a set of symbols, spreading to the set of symbols (e.g., to transform each symbol into a particular quantity of chips based at least in part on a spreading factor) and scrambling to the set of symbols (e.g., to scramble the set of chips to enable demodulation of the set of chips by a BS). The UE may apply the spreading and the scrambling based at least in part on short spreading code codebook sequences and long scrambling sequences, respectively. A short code sequence may be UE specific for each UE and a long sequence may be BS specific for each group of UEs using a particular BS. However, when using some low-coding rate modulation schemes, such as $\pi/2$ BPSK, $\pi/4$ QPSK, and/or the like, applying the set of sequences may not preserve the modulation scheme that was applied to the set of symbols, thereby preventing successful transmission, reception, and decoding of data of the set of symbols.

Some aspects, described herein, may enable symbol processing to preserve modulation applied to a set of symbols, such as for RSMA using NOMA. For example, a UE may determine that the UE is to modulate a set of symbols using a particular modulation scheme, and may select a set of sequences, which preserve the particular modulation scheme, for processing the set of symbols. In this case, the UE may process the set of symbols using the set of sequences, and may transmit the set of symbols based at least in part on processing the set of symbols. In this way, the UE enables use of particular modulation schemes, such as for RSMA using NOMA and/or the like.

Figure 7:
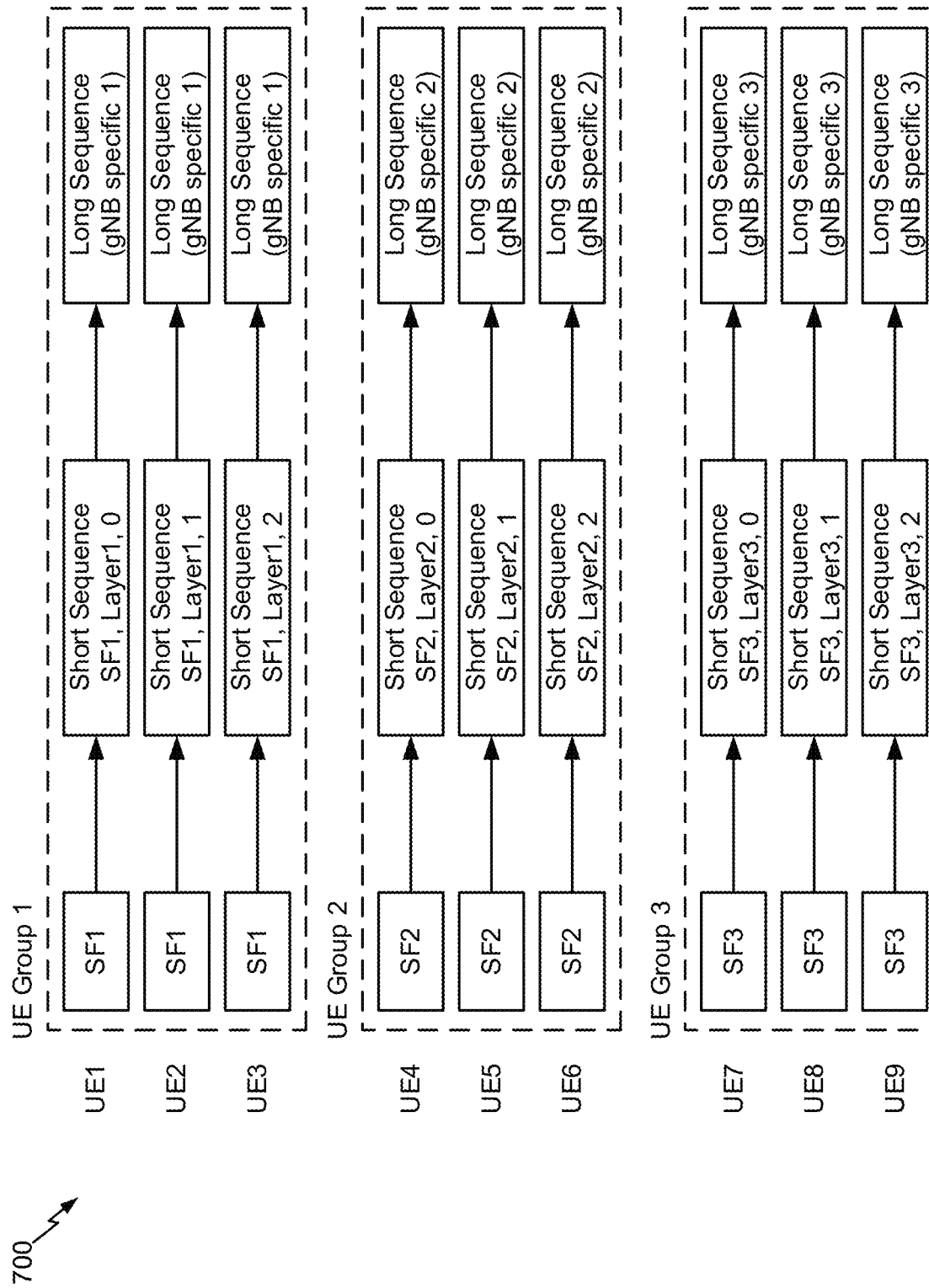
FIG. 7 is a diagram illustrating an example of resource spread multiple access with non-orthogonal multiple access, in accordance with various aspects of the present disclosure.

FIG. 7 is diagrams illustrating example 700 of RSMA using NOMA, in accordance with various aspects of the present disclosure. As shown in FIG. 7, example 700 may include a set of UEs 120 (e.g., shown as UE1 through UE9) 1 through 9 operating in a set of UE groups (e.g., UE group 1, UE group 2, and UE group 3).

As further shown in FIG. 7, UE group 1 may be associated with a spreading factor (SF) of 1, UE group 2 may be associated with a spreading factor of 2, and UE group 3 may be associated with a spreading factor of 3. As further shown in FIG. 7, each UE 120 of each UE group may be associated with a short sequence associated with a particular layer and a particular index value. For example, UE1 (e.g., a first UE 120 of UE group 1) may be associated with spreading factor 1, layer 1, and index 0. In contrast, UE2 may be associated with spreading factor 1, layer 1, and index 1. Based at least in part on using different index values, each UE 120 of UE group 1 is distinguishable from each other UE 120 of UE group 1. In contrast, UE4 (e.g., a first UE 120 of UE group 1) may be associated with spreading factor 2, layer 2, and index 0 (e.g., a same index as UE1). However, each UE 120 of UE group 1 may use a first type of long sequence (e.g., gNB specific long sequence 1 for a BS 110) while each UE of UE group 2 may use a second type of long sequence (e.g., a different gNB specific long sequence 2 for a different BS 110). In this way, each UE 120 is distinguishable by short sequence and/or by long sequence when processing symbols, as described in more detail below.

As indicated above, FIG. 7 is provided as an example. Other examples may differ from what is described with respect to FIG. 7.

Figure 8A:
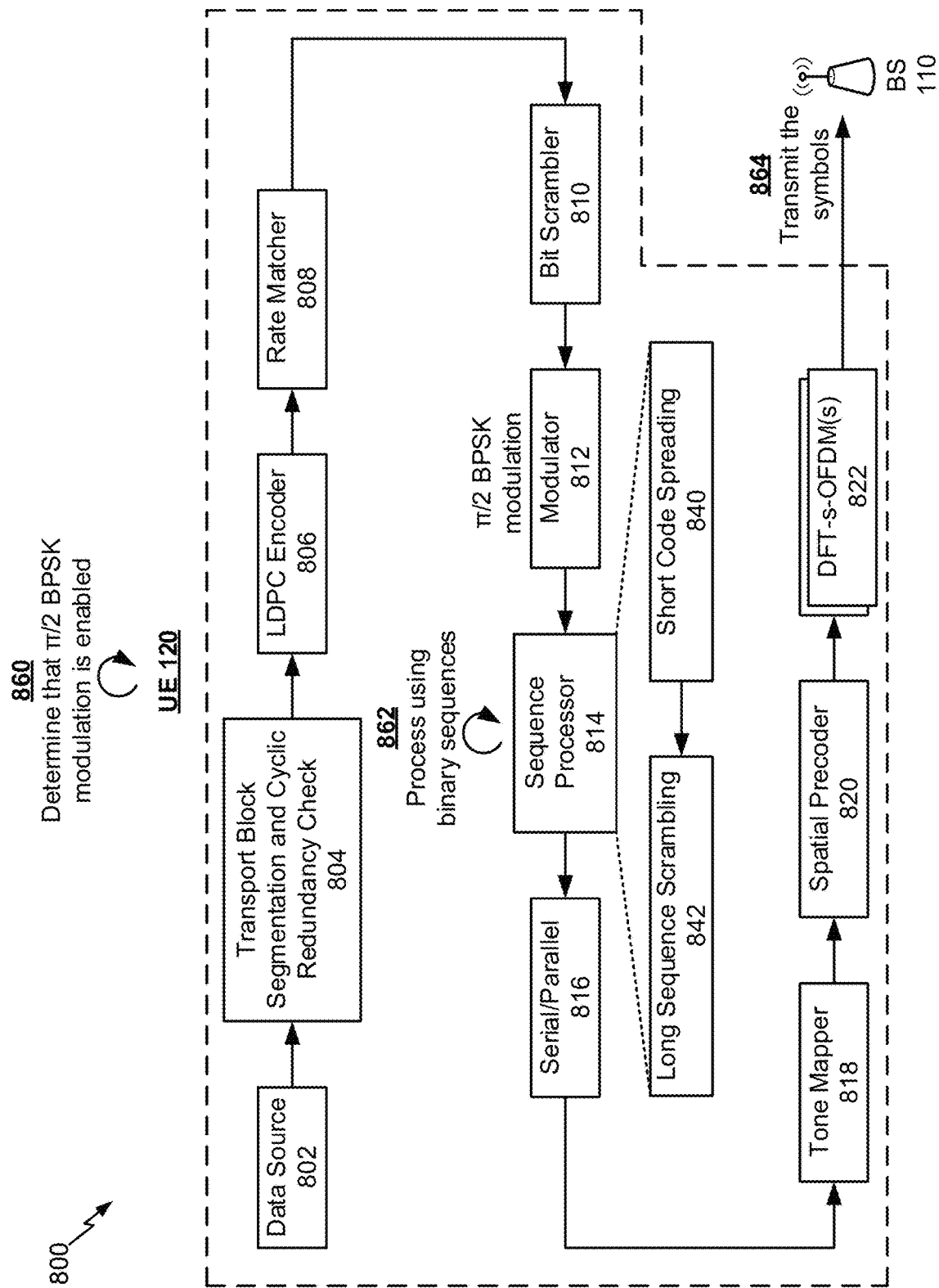
FIGS. 8A-8C are diagrams illustrating examples of symbol processing, in accordance with various aspects of the present disclosure.
Figure 8B:
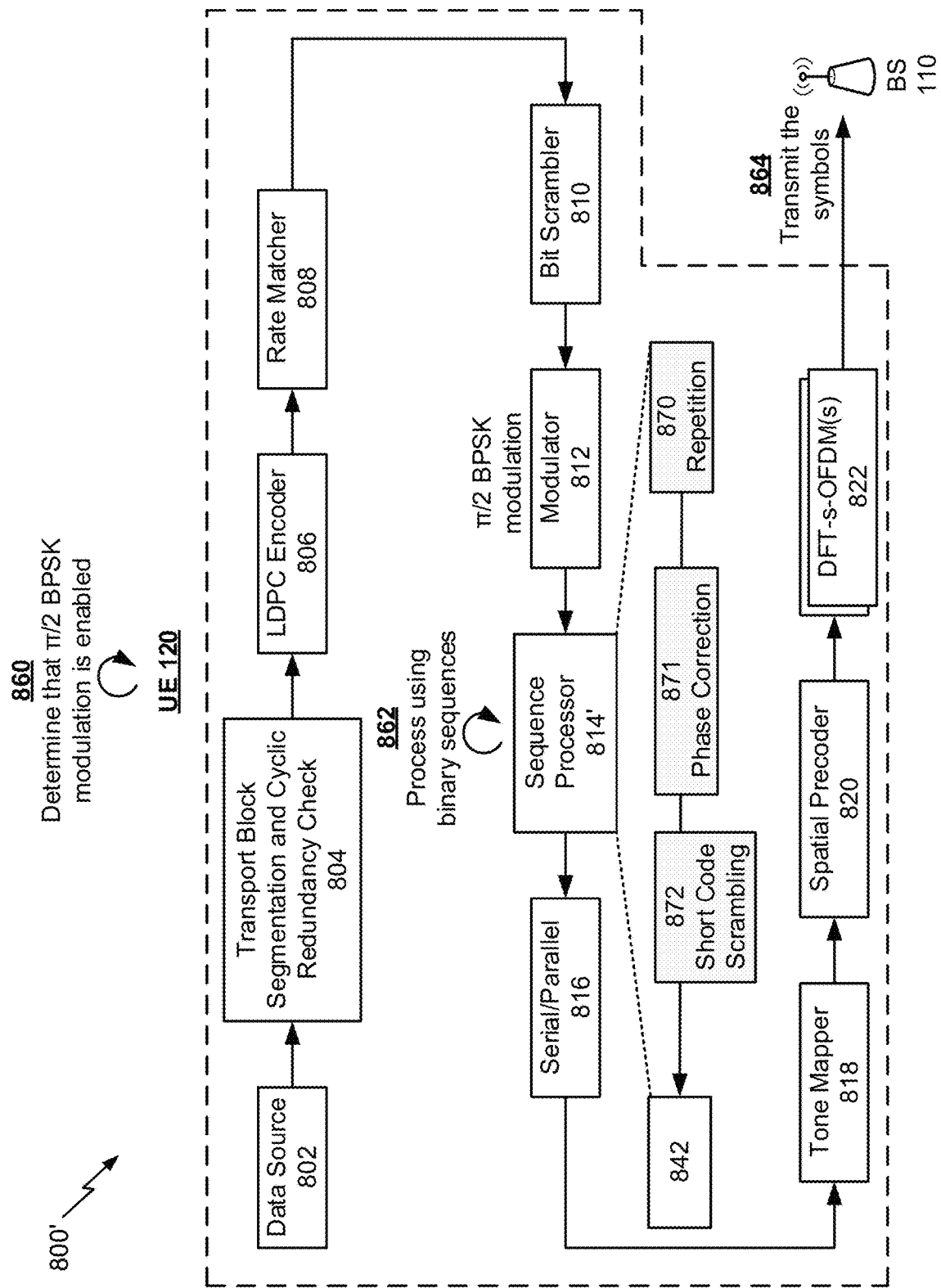
Figure 8C:
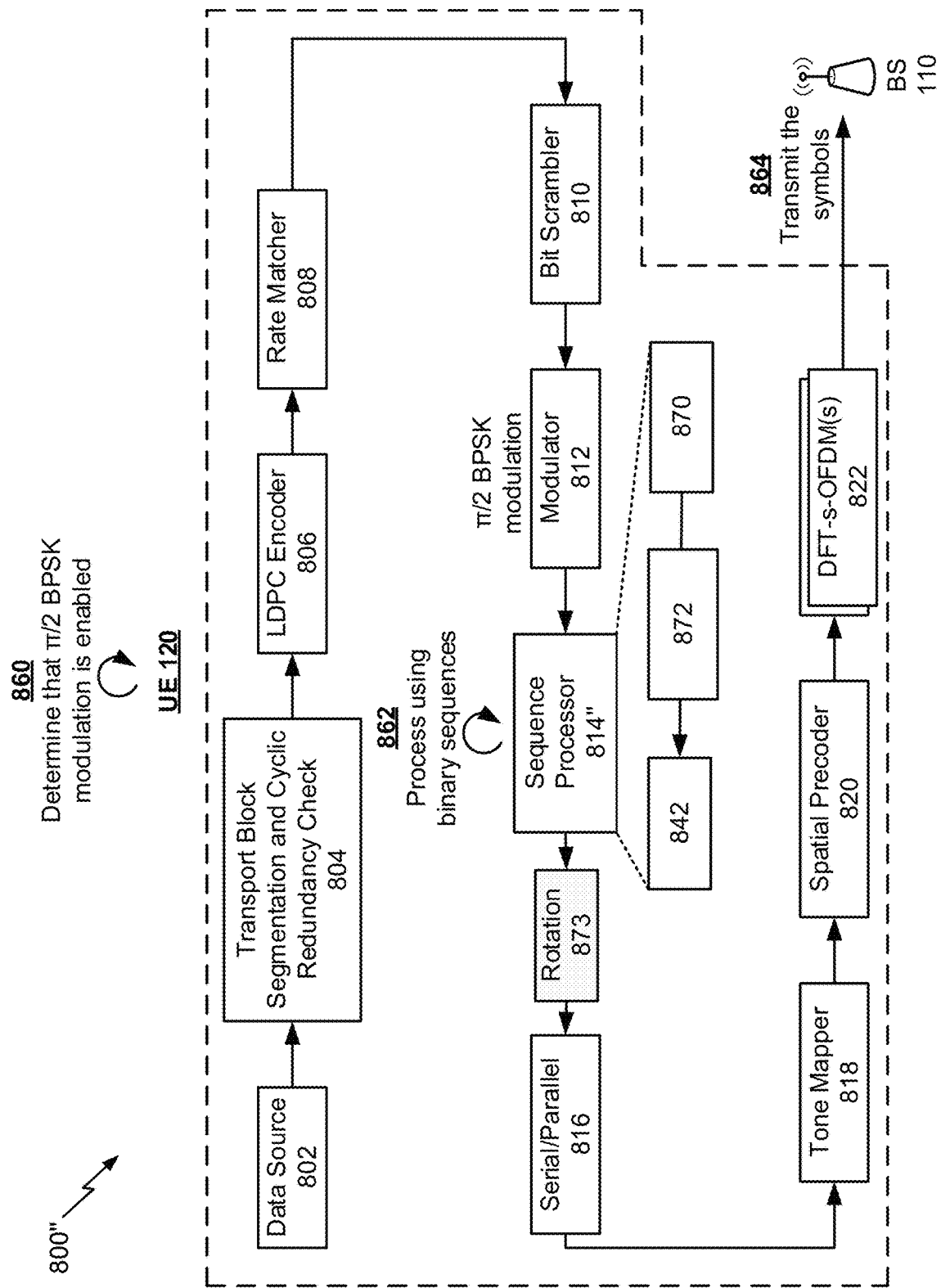

FIGS. 8A-8C are diagrams illustrating examples 800/800'/800'' of symbol processing, in accordance with various aspects of the present disclosure. As shown in FIGS. 8A-8C, example 800 may include a BS 110 and a UE 120.

As further shown in FIG. 8A, UE 120 may include a plurality of components for RSMA using NOMA based symbol processing. For example, UE 120 includes a data source component 802 to provide data; a transport block segmentation and cyclic redundancy check component 804 to perform transport block segmentation and a cyclic redundancy check; a low density parity check (LDPC) encoder component 806 to perform LDPC encoding; a rate matcher component 808 to perform rate matching; a bit scrambler component 810 to perform bit scrambling; a modulator component 812 to perform symbol modulation; a sequence processor component 814 to process symbols using a set of sequences; a serial/parallel component 816 to perform serial-to-parallel conversion; a tone mapper component 818 to perform tone mapping; a spatial precoder component 820 to perform precoding; a set of DFT-s-OFDM component(s) 822 to multiplex a waveform; and/or the like. In some aspects, sequence processor component 814 may include a short code spreading component 840 to perform short code based spreading and a long sequence scrambling component 842 to perform long sequence based scrambling. Although some aspects, described herein, are described in terms of a particular set of components, other components are possible, such as phase rotation components and/or the like.

As further shown in FIG. 8A, and by reference number 860, UE 120 may determine that a particular modulation scheme is enabled for UE 120. For example, UE 120 may determine that $\pi/2$ BPSK modulation is enabled for UE 120 (e.g., for modulator component 812). Additionally, or alternatively, UE 120 may determine that $\pi/4$ QPSK is enabled for UE 120. In some aspects, UE 120 may determine that the particular modulation scheme is enabled based at least in part on received signaling. For example, BS 110 may provide a grant to indicate that UE 120 is to use $\pi/2$ BPSK. Additionally, or alternatively, UE 120 may determine the particular modulation scheme without receiving a grant. For example, when operating in a massive machine type communications (mMTC) scenario, UE 120 may perform a downlink measurement, and may select $\pi/2$ BPSK as the modulation scheme based at least in part on the downlink measurement.

In some aspects, UE 120 may select a set of sequences based at least in part on the particular modulation scheme. For example, UE 120 may select a particular short code codebook for $\pi/2$ BPSK that preserves $\pi/2$ BPSK modulation for the set of symbols. In this case, the particular short code codebook may only include binary sequences rather than, for example, a short code codebook that includes both binary sequences and non-binary (e.g., QPSK sequences). For example, the particular short code codebook may use Hadamard code based sequences. Similarly for $\pi/4$ QPSK, UE 120 may select a particular short code codebook that only includes sequences that preserve QPSK (e.g., a set of non-binary sequences, such as QPSK sequences and/or the like).

Additionally, or alternatively, UE 120 may select a particular set of long sequences for long sequence scrambling. In this case, the particular set of long sequences may only include binary sequences. For example, the particular set of long sequences may be binary Gold sequences. In some aspects, the particular set of long sequences may use $\pi/2$ BPSK structure (rather than a BPSK binary sequence). For example, UE 120 may determine to use a $\pi/2$ BPSK structure for the particular set of long sequences to preserve a BSPK modulation scheme applied to the symbols.

In some aspects, UE 120 may select a subset of a set of sequences for use based at least in part on the particular modulation scheme. For example, UE 120 may select a subset of codes of a particular short code codebook (which may be termed a degenerated codebook) for $\pi/2$ BPSK that preserves $\pi/2$ BPSK modulation for the set of symbols. In this case, the degenerated codebook may include a first threshold quantity of sequences of the particular short code codebook that are binary sequences or are within a threshold amount of being binary sequences, and may not include other sequences of the particular short code codebook that are not binary sequences. Additionally, or alternatively, UE 120 may select a particular subset of a set of long sequences. For example, UE 120 may select, from a set of long sequences that includes both binary sequences and non-binary sequences (e.g., QPSK sequences), a subset of long sequences that are binary sequences. In some aspects, for $\pi/4$ QPSK, UE 120 may select a subset of a set of long sequences, which includes both binary sequences and non-binary sequences, that preserve $\pi/4$ QPSK modulation (e.g., the non-binary sequences).

In some aspects, UE 120 may select the particular short code codebook that only includes binary sequences and the particular set of long sequences that only includes binary sequences. For example, UE 120 may store a plurality of short code codebooks and a plurality of sets of long sequences, and may select a particular short code codebook for $\pi/2$ BPSK and a particular set of long sequences for $\pi/2$ BPSK. In some aspects, UE 120 may select both the degenerated codebook and the subset of the set of long sequences. For example, UE 120 may store a single short code codebook and a single set of long sequences, and may select a subset of the single short code codebook and the single set of long sequences (e.g., based at least in part on stored selection information). In some aspects, UE 120 may select a particular short code codebook that only includes binary sequences, and may select a subset of the single set of long sequences. In some aspects, UE 120 may select the degenerated codebook from the single short code codebook, and may select the particular set of long sequences that only includes binary sequences. In this way, UE 120 uses a particular set of sequences to preserve the particular modulation scheme.

In some aspects, UE 120 may determine to process the symbols using a phase rotation sequence. For example, for a spreading factor of two repetitions for symbol spreading and a short code sequence of, for example, +/−1, +/−1, +/−j, +/−j, +/−1, +/−1, . . . , UE 120 may apply alternating 0 degree, 90 degree, 90 degree, and 0 degree phase rotations in sequence, thereby preserving the particular modulation scheme. In some aspects, UE 120 may apply the phase rotation using a phase correction component. For example, as shown in FIG. 8B, sequence processor component 814' may include a repetition component 870 and a phase correction component 871 to preprocess symbols before scrambling using, respectively, short codes (e.g., using short code scrambling component 872) and long sequences (e.g., using long sequence scrambling component 842). In some aspects, UE 120 may apply the phase rotation using a phase rotator after spreading and scrambling. For example, as shown in FIG. 8C, after processing using sequence processor component 814", UE 120 may use a phase rotator 873 (e.g., $\pi/2$ phase rotator) to apply the alternating phase rotations. In this way, UE 120 uses phase rotation to preserve the particular modulation scheme.

Returning to FIG. 8A, and as shown by reference number 862, UE 120 may process symbols using binary sequences. For example, for $\pi/2$ BPSK, UE 120 may apply binary short codes of a short code codebook, binary scrambling sequences of a set of long sequences, and/or the like. Additionally, or alternatively, for $\pi/4$ QPSK, UE 120 may apply non-binary short codes, non-binary scrambling sequences, and/or the like. In this way, based at least in part on selecting and using the sequences for processing (e.g., the short code codebook and/or a subset of short codes thereof, the set of long sequences and/or a subset of long sequences thereof, and/or the like), UE 120 preserves the particular modulation scheme, thereby enabling successful transmission, reception, and decoding of data included in the set of symbols. In some aspects, UE 120 may apply a phase rotation to the set of symbols to process the set of symbols. For example, UE 120 may phase rotate the symbols before spreading and scrambling, after spreading and scrambling, and/or the like, thereby preserving the particular modulation scheme.

As further shown in FIG. 8A, and by reference number 864, UE 120 may transmit the symbols. For example, UE 120 may transmit the symbols to BS 110 based at least in part on processing the symbols. In this case, BS 110 may receive, process, and decode the symbols based at least in part on UE 120 preserving the particular modulation scheme. In this way, UE 120 enables use of $\pi/2$ BPSK, $\pi/4$ QPSK, and/or the like in an RSMA using NOMA communications system.

As indicated above, FIGS. 8A-8C are provided as an example. Other examples may differ from what is described with respect to FIGS. 8A-8C.

Figure 9:
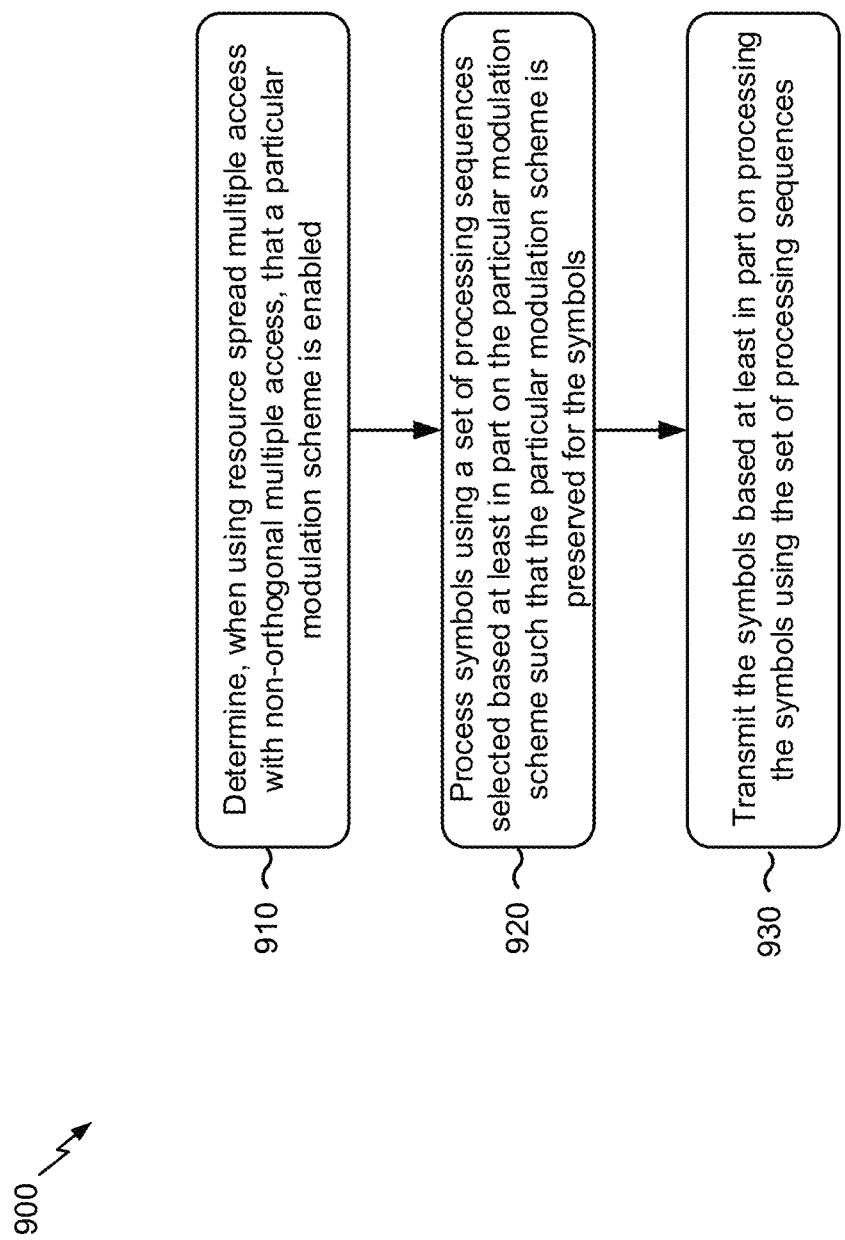
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs symbol processing.

As shown in FIG. 9, in some aspects, process 900 may include determining, when using resource spread multiple access with non-orthogonal multiple access, that a particular modulation scheme is enabled (block 910). For example, the UE (e.g., using receive processor 258, controller/processor 280, transmit processor 264, modulator 254, and/or the like) may determine, when using resource spread multiple access with non-orthogonal multiple access, that a particular modulation scheme is enabled, as described above.

As shown in FIG. 9, in some aspects, process 900 may include processing symbols using a set of processing sequences selected based at least in part on the particular modulation scheme such that the particular modulation scheme is preserved for the symbols (block 920). For example, the UE (e.g., using receive processor 258, controller/processor 280, transmit processor 264, modulator 254, and/or the like) may process symbols using a set of processing sequences selected based at least in part on the particular modulation scheme such that the particular modulation scheme is preserved for the symbols, as described above.

As shown in FIG. 9, in some aspects, process 900 may include transmitting the symbols based at least in part on processing the symbols using the set of processing sequences (block 930). For example, the UE (e.g., using transmit processor 264, TX MIMO processor 266, modulator 254, antenna 252, and/or the like) may transmit the symbols based at least in part on processing the symbols using the set of processing sequences, as described above.

Process 900 may include additional aspects, such as any single aspect and/or any combination of aspects described below and/or in connection with one or more other processes described elsewhere herein.

In some aspects, the UE is configured to perform short code spreading when processing the symbols using a processing sequence of the set of processing sequences. In some aspects, the UE is configured to perform long sequence scrambling when processing the symbols using a processing sequence of the set of processing sequences. In some aspects, the particular modulation scheme is $\pi/2$ binary phase shift keying or $\pi/4$ quadrature phase shift keying.

In some aspects, the set of processing sequences includes a short code book selected based at least in part on the particular modulation scheme. In some aspects, the set of processing sequences includes a set of long sequences selected based at least in part on the particular modulation scheme. In some aspects, the set of processing sequences includes a first subset of a short code book selected based at least in part on the particular modulation scheme, and the short code book includes a second subset that does not preserve the particular modulation scheme.

In some aspects, the set of processing sequences includes a first subset of a set of long sequences selected based at least in part on the particular modulation scheme, and the set of long sequences includes a second subset that does not preserve the particular modulation scheme. In some aspects, the UE is configured to apply a phase rotation or a phase correction based at least in part on the particular modulation scheme such that the particular modulation scheme is preserved. In some aspects, the UE is configured to determine that the particular modulation scheme is enabled based at least in part on received signaling or a downlink measurement.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
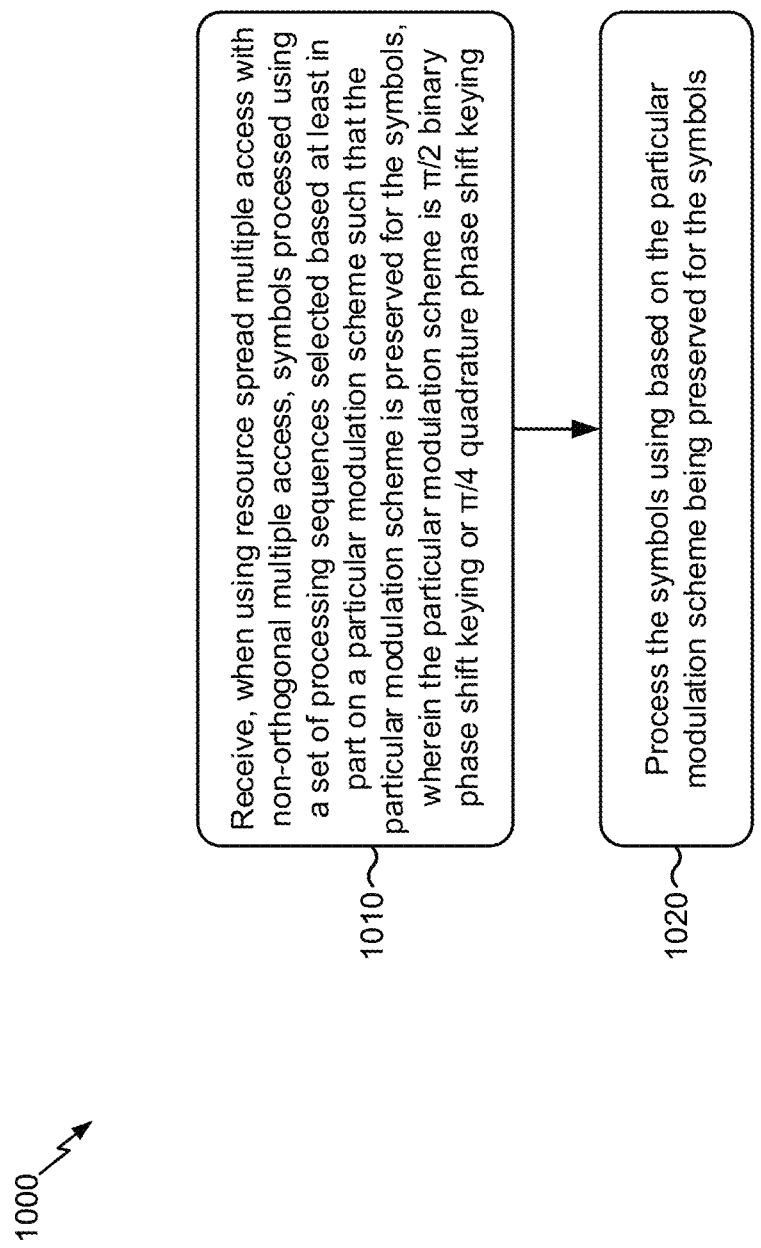
FIG. 10 is a diagram illustrating an example process performed, for example, by a user equipment, in accordance with various aspects of the present disclosure.

FIG. 10 is a diagram illustrating an example process 1000 performed, for example, by a BS, in accordance with various aspects of the present disclosure. Example process 1000 is an example where a BS (e.g., BS 110) performs symbol processing.

As shown in FIG. 10, in some aspects, process 1000 may include receiving, when using resource spread multiple access with non-orthogonal multiple access, symbols processed using a set of processing sequences selected based at least in part on a particular modulation scheme such that the particular modulation scheme is preserved for the symbols, wherein the particular modulation scheme is $\pi/2$ binary phase shift keying or $\pi/4$ quadrature phase shift keying (block 1010). For example, the BS (e.g., using antenna 234, DEMOD 232, MIMO detector 236, receive processor 238, controller/processor 240, and/or the like) may receive, when using resource spread multiple access with non-orthogonal multiple access, symbols processed using a set of processing sequences selected based at least in part on a particular modulation scheme such that the particular modulation scheme is preserved for the symbols, as described in more detail above. In some aspects, the particular modulation scheme is $\pi/2$ binary phase shift keying or $\pi/4$ quadrature phase shift keying.

As shown in FIG. 10, in some aspects, process 1000 may include processing the symbols using based on the particular modulation scheme being preserved for the symbols (block 1020). For example, the BS (e.g., using controller/processor 240 and/or the like) may process the symbols using based on the particular modulation scheme being preserved for the symbols, as described in more detail above.

Process 1000 may include additional aspects, such as any single aspect and/or any combination of aspects described below and/or in connection with one or more other processes described elsewhere herein.

In some aspects, the symbols are processed using short code spreading. In some aspects, the symbols are processed using long sequence scrambling. In some aspects, the set of processing sequences includes a short code book associated with the particular modulation scheme. In some aspects, the set of processing sequences includes a set of long sequences associated with the particular modulation scheme. In some aspects, the set of processing sequences includes a first subset of a short code book associated with the particular modulation scheme, the short code book includes a second subset that does not preserve the particular modulation scheme.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining, when using resource spread multiple access with non-orthogonal multiple access, that a particular modulation scheme is enabled,
        wherein the particular modulation scheme is π/2 binary phase shift keying or π/4 quadrature phase shift keying;
    processing symbols using a set of processing sequences selected based at least in part on the particular modulation scheme such that the particular modulation scheme is preserved for the symbols,
        wherein the set of processing sequences includes a first subset, of a short code book or a set of long sequences, selected based at least in part on the particular modulation scheme, and
        wherein the short code book or the set of long sequences includes a second subset that does not preserve the particular modulation scheme; and
    transmitting the symbols based at least in part on processing the symbols using the set of processing sequences.

2. The method of claim 1, wherein the UE is configured to perform short code spreading when processing the symbols using a processing sequence of the set of processing sequences.

3. The method of claim 1, wherein the UE is configured to perform long sequence scrambling when processing the symbols using a processing sequence of the set of processing sequences.

4. The method of claim 1, wherein the set of processing sequences includes the short code book.

5. The method of claim 1, wherein the set of processing sequences includes the set of long sequences.

6. The method of claim 1, wherein the first subset and the second subset are subsets of the short code book.

7. The method of claim 1, wherein the first subset and the second subset are subsets of the set of long sequences.

8. The method of claim 1, wherein the UE is configured to apply a phase rotation or a phase correction based at least in part on the particular modulation scheme such that the particular modulation scheme is preserved.

9. The method of claim 1, wherein the UE is configured to determine that the particular modulation scheme is enabled based at least in part on received signaling or a downlink measurement.

10. A method of wireless communication performed by a base station (BS), comprising:
    receiving, when using resource spread multiple access with non-orthogonal multiple access, symbols processed using a set of processing sequences selected based at least in part on a particular modulation scheme such that the particular modulation scheme is preserved for the symbols,
        wherein the particular modulation scheme is π/2 binary phase shift keying or π/4 quadrature phase shift keying,
        wherein the set of processing sequences includes a first subset, of a short code book or a set of long sequences, associated with the particular modulation scheme, and
        wherein the short code book or the set of long sequences includes a second subset that does not preserve the particular modulation scheme;
    processing the symbols using based on the particular modulation scheme being preserved for the symbols.

11. The method of claim 10, wherein the symbols are processed using short code spreading.

12. The method of claim 10, wherein the symbols are processed using long sequence scrambling.

13. The method of claim 10, wherein the set of processing sequences includes the short code book.

14. The method of claim 10, wherein the set of processing sequences includes the set of long sequences.

15. The method of claim 10, wherein the first subset and the second subset are subsets of the short code book.

16. A user equipment (UE) for wireless communication, comprising:
    a memory; and
    one or more processors operatively coupled to the memory, the memory and the one or more processors configured to:
        determine, when using resource spread multiple access with non-orthogonal multiple access, that a particular modulation scheme is enabled,
            wherein the particular modulation scheme is π/2 binary phase shift keying or π/4 quadrature phase shift keying;
        process symbols using a set of processing sequences selected based at least in part on the particular modulation scheme such that the particular modulation scheme is preserved for the symbols,
            wherein the set of processing sequences includes a first subset, of a short code book or a set of long sequences, selected based at least in part on the particular modulation scheme, and
            wherein the short code book or the set of long sequences includes a second subset that does not preserve the particular modulation scheme; and
        transmit the symbols based at least in part on processing the symbols using the set of processing sequences.

17. The UE of claim 16, wherein the UE is configured to perform short code spreading when processing the symbols using a processing sequence of the set of processing sequences.

18. The UE of claim 16, wherein the UE is configured to perform long sequence scrambling when processing the symbols using a processing sequence of the set of processing sequences.

19. The UE of claim 16, wherein the set of processing sequences includes the short code book.

20. The UE of claim 16, wherein the set of processing sequences includes the set of long sequences.

21. The UE of claim 16, wherein the first subset and the second subset are subsets of the short code book.

22. The UE of claim 16, wherein the first subset and the second subset are subsets of the set of long sequences.

23. The UE of claim 16, wherein the UE is configured to apply a phase rotation or a phase correction based at least in part on the particular modulation scheme such that the particular modulation scheme is preserved.

24. The UE of claim 16, wherein the UE is configured to determine that the particular modulation scheme is enabled based at least in part on received signaling or a downlink measurement.

25. A base station (BS) for wireless communication, comprising:
  a memory; and
  one or more processors operatively coupled to the memory, the memory and the one or more processors configured to:
    receive, when using resource spread multiple access with non-orthogonal multiple access, symbols processed using a set of processing sequences selected based at least in part on a particular modulation scheme such that the particular modulation scheme is preserved for the symbols,
      wherein the particular modulation scheme is $\pi/2$ binary phase shift keying or $\pi/4$ quadrature phase shift keying,
      wherein the set of processing sequences includes a first subset, of a short code book or a set of long sequences, associated with the particular modulation scheme, and
      wherein the short code book or the set of long sequences includes a second subset that does not preserve the particular modulation scheme;
    process the symbols using based on the particular modulation scheme being preserved for the symbols.

26. The BS of claim 25, wherein the symbols are processed using short code spreading.

27. The BS of claim 25, wherein the symbols are processed using long sequence scrambling.

28. The BS of claim 25, wherein the set of processing sequences includes the short code book.

29. The BS of claim 25, wherein the set of processing sequences includes the set of long sequences.

30. The BS of claim 25, wherein the first subset and the second subset are subsets of the short code book.

* * * * *